March 18, 1924.   1,487,073

A. T. NOGRADY

DIFFERENTIAL GEARING

Filed March 17, 1921   2 Sheets-Sheet 2

INVENTOR
An Dor T. Nogrady
BY
ATTORNEY

Patented Mar. 18, 1924.

1,487,073

UNITED STATES PATENT OFFICE.

ANDOR T. NOGRADY, OF WYANDOTTE, MICHIGAN, ASSIGNOR TO NOGRADY DIFFERENTIAL COMPANY, OF WICHITA, KANSAS, A CORPORATION OF WEST VIRGINIA.

DIFFERENTIAL GEARING.

Application filed March 17, 1921. Serial No. 453,050.

*To all whom it may concern:*

Be it known that I, ANDOR T. NOGRADY, a citizen of the United States, residing at Wyandotte, in the county of Wayne and State of Michigan, have invented certain new and useful Improvements in Differential Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of differential gearing known in the nomenclature of the trade as "locking differentials" and it particularly has reference to a mechanism utilized for driving aligning separate parts or sections of a driven axle of a motor vehicle wherein the driving power may be applied through the axle members to the ground wheels and whereby variations in speed of the respective driven wheels of the vehicle are permitted whenever the vehicle deviates from a straight course, the construction being such that when either wheel loses traction or partially loses traction, a thrust generated within the gear housing effects an engagement of the differentiating parts so that they are driven as a unit. In the event, however, that one wheel is relatively retarded and the other is relatively advanced, as in the case when differentiating, the effective engagement of the parts is relieved so that differential movement is permitted. With such a construction when the traction in either of the rear wheels varies, the thrusts generated in the gear housing are of sufficient force to set up a load that is transmitted to the housing as a rotary load and from there communicated to the main axle shaft.

The invention contemplates the provision of a differential gearing which may be constructed without increasing the number of parts in the conventional embodiment of an ordinary differential gearing, thereby enabling the cost of construction to be confined within the limits of cost of an ordinary type of differential gearing, this being important since the advantages of the so-called "locking differential" gearing are well appreciated.

The invention also contemplates the provision of means for shifting the thrusts of certain elements in line with the axle parts so that the axle member may engage the housing member or be permitted to differentiate therefrom, and to this end I have shown oil grooves arranged between the clutching faces of the thrust members and the housing or complementary members with which they co-operate, the grooves being so arranged and disposed that the gear teeth will force oil into the grooves on the faces of the clutch elements to cause effective lubrication and enhance the commercial life of the gear due to the fact that the life of the gearing is dependent to a large degree upon the rapidity at which the oil film can be replaced during differential action.

The general embodiment of the invention approximates the construction shown in my United States Patent No. 1,361,895, granted December 14, 1920, the essential difference being that the axle members in the present case are integral with the driven gears in contra-distinction to the separate axle members shown in the patent. In the present form, the cost of manufacture may be reduced by forming the driven gears and axle members integral.

I have also provided novel forms of gear teeth on the driving and driven gears to provide rolling contacts when the axle members are differentiating so that there will always be intermeshing, contacting teeth between the driven and driving gears, thereby reducing liability of lost motion to a minimum and correspondingly reducing the liability of chattering when the axle members are differentiating.

It is, of course, important that a system of positive lubrication be provided between the faces of the opposing clutches and an efficient means is provided in the present application to take care of the lubrication between opposing clutch faces so that the durability of the differential gearing as a whole will be materially enhanced.

It is also an important feature of my invention to provide the driven gears as well as the interposed driving gears with teeth so generated as to have relatively high pressure angles so as to cause the driven gears to effect clutch engagement with the housing through the thrusts generated by the high pressure angle of the gear teeth. The construction is such that when the vehicle is moving in a straight line the two axle members are driven in unison as a solid axle, but when the vehicle is differentiating one of the driven gears may have clutch engagement with the housing while the other gear connected to the over running wheel through the axle will release from clutch engagement with the housing, permitting differential action, this action being enhanced by the fact that a film of oil may be introduced between the clutch faces of the driven gears and the housing to effect the release of the driven gear for the over running wheel, in fact the construction is such that the gears tend to maintain a film of oil between the driven gears and the housing but when the vehicle is moving in a straight line and the side gears are subjected to equal and opposite pressures the film of oil is practically squeezed out from between the side gears and the housing so that the pinions, the gears, the housing, and the two axle members move as a solid structure but when the vehicle is deviating from a straight line the over running wheel will tend to impart an over running effect to its driven or side gear so that there will be no pull on the teeth of the side gear between the teeth of the pinions, thus the pumped film of oil may maintain the side gear out of clutched engagement with the housing until the vehicle is again moving in a straight line or until it is turned in a direction to cause the then over running wheel to become the retarding wheel and of course it is obvious that whenever the pinions are exerting driving forces on the side gears the side gears will tend to move into clutched engagement and it is important here to note that in differential gear construction, the side gears always tend to spread or move into engagement with the housing but in the standard differential gearing means is provided to prevent the side gears from binding on the housing and no means is provided for effecting release of the side gears. In my invention I have taken advantage of the known fact that the side gears tend to spread apart and have so constructed the teeth of the gears that they have a high pressure angle or low pitch which will increase the tendency of the side gears to spread apart when the differential gearing is moving in a straight line, this being desirable to prevent a slipping wheel from consuming all of the power, but my invention provides for the release of the clutched side gears by relieving friction with a film of oil which preferably can be introduced between the clutched faces of the side gear and the housing member by the action of the gears themselves which constitute a pump. The novel construction will be clearly apparent hereinafter by reference to the description.

Figure 1:
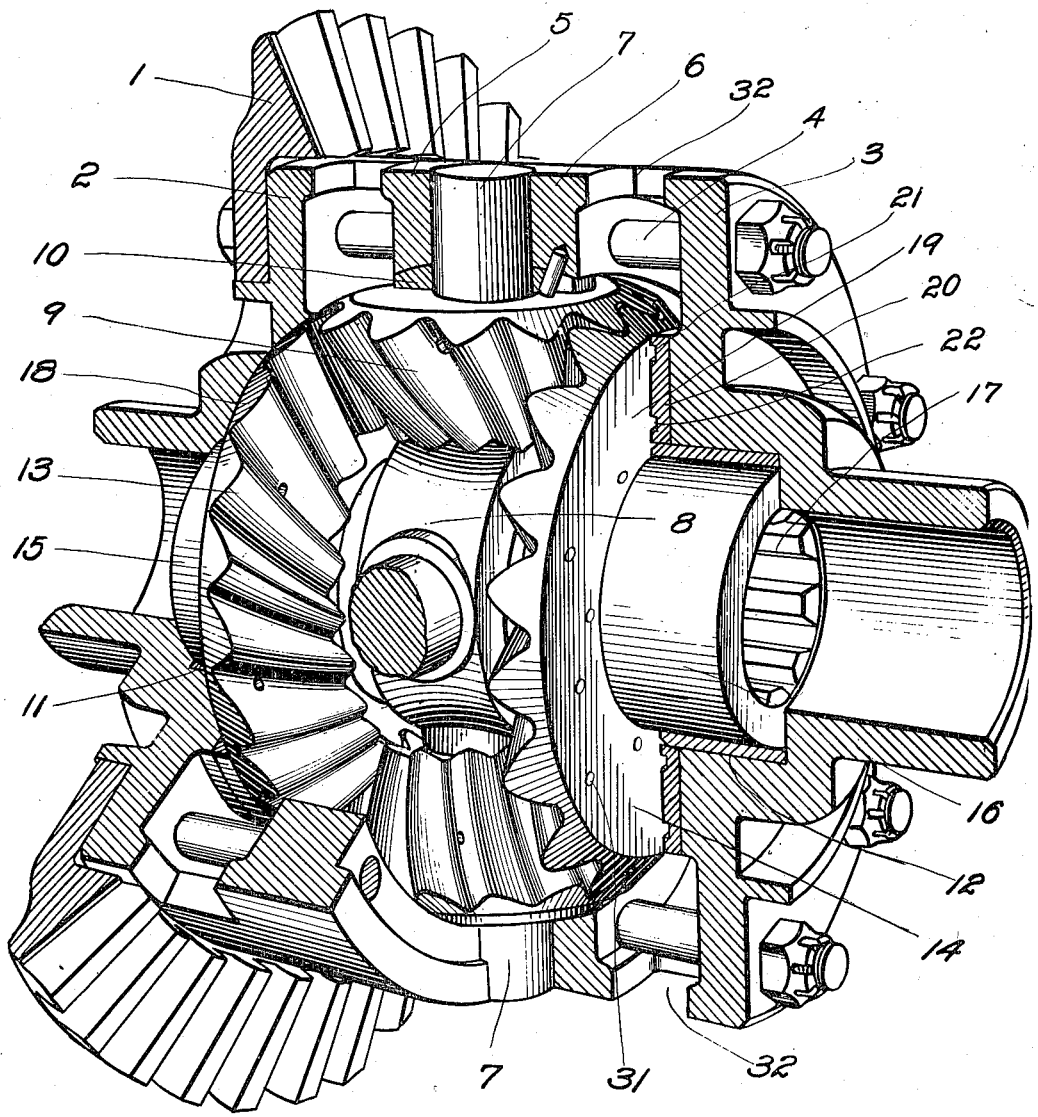
Fig. 1 is a perspective view of a differential gearing constructed in accordance with my invention, parts being broken away to show the interior construction thereof.

Referring now to the drawings by numerals of reference:

1 designates the master wheel which drives the housing, shown as consisting of the complementary housing members 2 and 3. The complementary housing members 2 and 3 are fastened together by transverse bolts 4, which also serve as fastening means for connecting the master gear 1 to the housing, as best seen in Figs. 1 and 2.

Figure 2:
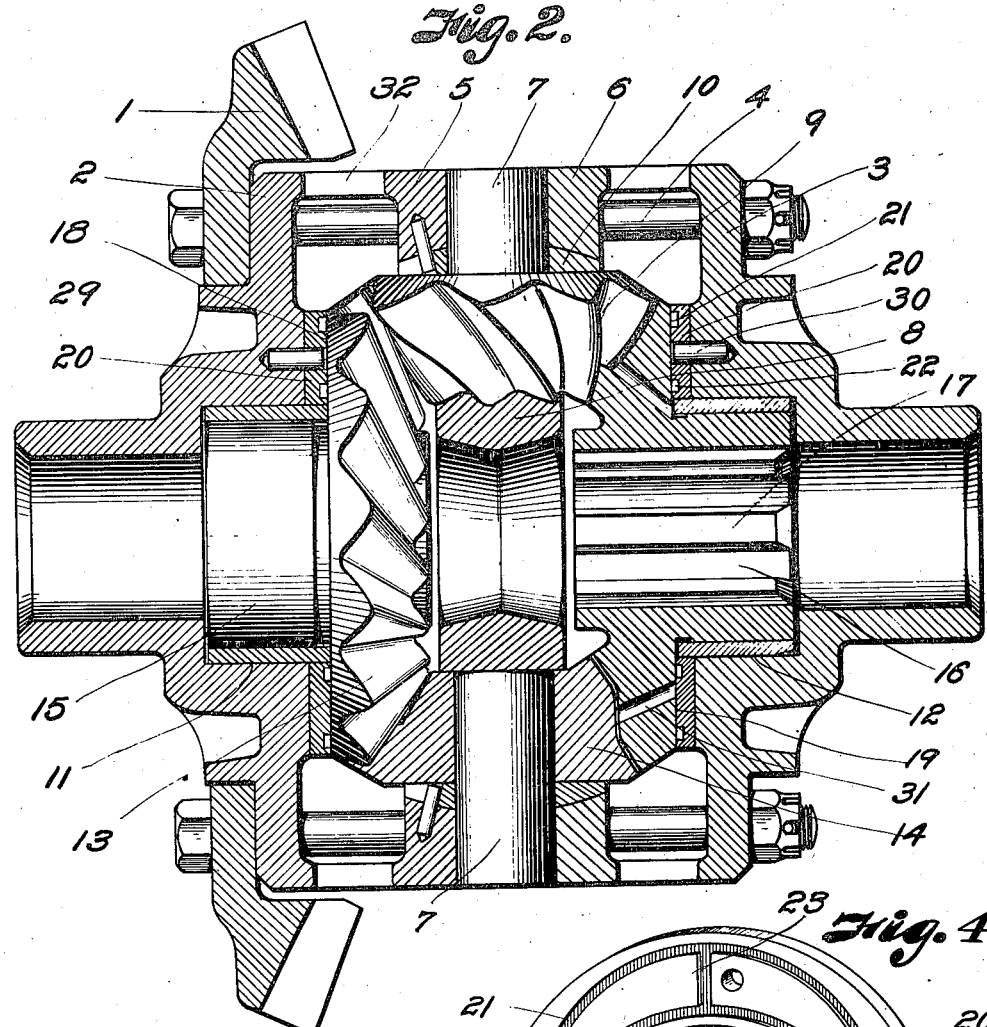
Fig. 2 is a vertical, longitudinal, sectional view through the differential gearing including the housing.

The complementary housing members 2 and 3 carry spaced, semi-circular mating bearing portions 5 and 6, which, when brought together as shown in Figs. 1 and 2, constitute bearings for the trunnions 7 of a spider 8. The trunnions 7 constitute shafts on which are loosely mounted the driving gears or pinions 9, which operate substantially the same as the pinion gears of an ordinary differential except in so far as they are improved by the form of teeth to be described hereinafter. Wear washers 10 may be provided for the pinions if desired.

At right angles to the pinions and mounted within the recessed portions 11 and 12 of the housing members 2 and 3 are the driven gear members 13 and 14 in mesh with the pinions so that teeth on each driven gear will be at all times in mesh with teeth on the driving gears.

Formed integrally with the hubs of the driven gear members 11 and 12 are axle members 15 and 16, preferably internally splined as at 17 to constitute keys receivable within slots in the axle sections (not shown), it being understood that the axle is a split or sectional axle consisting of aligning members, each of which is capable of having variable relative movement with respect to the other and the gear 1, the members, however, being normally driven in unison when the vehicle is traveling in a straight line or whenever one of the wheels of the vehicle loses traction.

Figure 4:
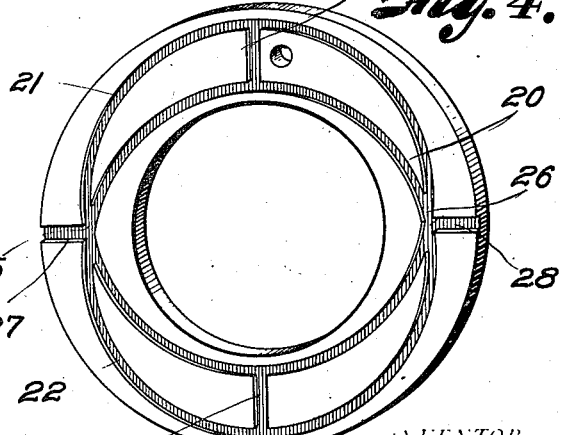
Fig. 4 is a detail perspective view of a clutch face or washer in which the lubricating grooves are provided.

Each driven gear is provided with a clutch face, as indicated at 18 and 19, and each clutch face on each driven gear co-operates with a complementary clutch face, rigid with its complementary housing member. For convenience, I have shown the clutch faces rigid with the housing and consisting of rings or washers, one of which is illustrated in detail in Fig. 4 and designated 20.

The ring-shaped clutch face is provided with inter-communicating grooves shown as consisting of two circular grooves 21 and 22 eccentric to one another and eccentric to the axis or center of the disk 20, which carries them. The grooves are shown as communicating one with the other by the cross grooves 23 and 24, which are within the perimeter of the disk 20. The grooves 21 and 22 also communicate with one another at right angles to the grooves 23 and 24, as at 25 and 26, and they also communicate with radial grooves 27 and 28 which extend to the perimeter of the disk 20. The disks or washers 20 may be fastened to the faces of the complementary housing members 2 and 3 by pins 29 and 30 respectively. It is understood, of course, that the grooves might be cut in the faces of the complementary members 2 and 3 or in the clutch faces 18 and 19 of the driven members 13 and 14.

The application of washers or removable wear plates, however, is the more practical method and it is, therefore, recommended.

Figure 3:
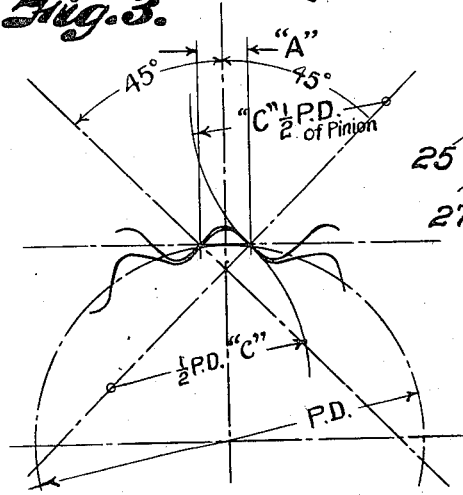
Fig. 3 is a diagrammatic view of a tooth development.

The teeth on the driven gears, as well as the teeth on the driving gears or pinions, are in the form of bevels, preferably generated in accordance with the diagram shown in Fig. 3, the teeth being substantially V-shaped in cross section and of such shape as to provide rolling contacts between the teeth on the driving gears and the teeth on the driven gears, the advantage being that substantially continuous toothed contact and constant tooth pressure will be provided because the co-operating teeth on the driving and driven gears will always be in contact before the preceding contacting teeth have moved out of mesh. This rolling contact materially reduces, if not entirely eliminates, all liability of chattering when the gearing is differentiating, which is possible if straight tooth gears were employed.

The pressure angles of the V-shaped teeth are preferably such as to produce longitudinal thrusts equivalent to the tangential pressure on the teeth.

The gears are shown as provided with through openings or perforations 31, which are adapted to intermittently register with the grooves in the clutch faces, shown as the disks 20. As the driven gears rotate about their axes, the meshing teeth of the driving and driven gears will act as geared pumps to squeeze the lubricant through the openings 31 into the grooved portions of the disks 20 so that a lubricating system will be provided, insuring feeding of the lubricant into the grooves of the clutch faces. The lubricant may circulate around the grooves and intermittently be forced out into the gear case through the grooves 27 and 28. It will, therefore, be seen that a film of lubricant may at all times be provided between the clutch faces so as to prevent grinding or abrading of the clutch faces when in action.

It will, therefore, be seen that when the parts are properly assembled and the vehicle is traveling in a straight line and the gearing housing is rotated, the pinions are carried with it and impart equal rotative movement to the gears 13 and 14 and through them, to the axle members so that the power factor is divided between the two members of the split axle and each wheel receives a proportionate amount of the developed power communicated to the gear 1.

If the vehicle deviates from a straight line as, for example, in making a turn, the outside wheel may increase its speed, allowing the gear member 13 or 14, as the case may be, to rotate faster than its complementary gear member.

Attention is called to the fact that it is not the purpose of the invention to provide a spiral gear type of gearing but rather to introduce a novel tooth form to insure counteracting pressure whereby the teeth can perform dual functions, thereby confining the structure to a minimum number of parts so as to reduce the cost of production.

The curvatures of the spiral teeth are relatively low on account of the high pressure angle employed because the higher the curvature of the teeth, the greater the tendency to destroy the effect of the high pressure angle essential to accomplish the desired result.

It will be apparent, of course, that suitable lubricating openings may be provided wherever expedient. The gear housing consisting of the members 2 and 3 may be provided with slots 32, through which the lubricant may enter from the gear case, (not shown). The lubricant will distribute itself over the moving parts, the teeth of the intermeshing gears being particularly effective in forcing the lubricant through the openings 30 and into the grooved portion of the clutch face or disk 20.

In the claims I shall refer to the binding of the thrust faces with their seats as "engagements" therewith, having in mind frictional engagement or positive engagement, dependent upon whether the thrust faces and seats are simply frictional faces or constructed for positive engagement.

Attention is called to the fact that the relative movement between the gears and their thrust faces and the pinions and their thrust faces is very slight so that in practice, the actual shifting of the gears and pinions will be hardly perceptible, the movement being only necessary to effect a binding of the parts and when the gear is differentiating, the relatively close clearances may be provided without causing the necessary thrusts to effect binding of the parts.

Attention is also called to the fact that the thrusts generated in the housing may be localized to usefully function to cause engagement between certain parts of the mechanism to produce an effective so-called "locking" differential and since the degree of generated thrust can be determined, it will be apparent that by varying the pitch of the teeth on the thrust elements, such as the gears and pinions, the degree of thrust that is to be generated within the housing may be controlled.

What I claim and desire to secure by Letters-Patent is:

1. In a differential gearing, a driving member including a housing, pinion gears mounted in the housing, cooperating driven gears within the housing and meshing with the pinion gears, the driven gears and the housing having sets of co-operating clutch faces, there being lubricating ducts between the driven gears and the housing for each set, and ports in the driven gears to communicate with said ducts whereby relative movement between the driving gears and driven gears will force lubricating material through the ports and into the ducts to supply lubricant between the co-operating clutch faces of each set, and axle-engaging means carried by the respective driven gears.

2. In a differential gearing, a driving member including a housing, driving gear members within the housing, driven gear members within the housing, and clutch faces comprising washers interposed between the driven gears and the housing and provided with lubricant-circulating grooves, the driven gears having ports communicating with the grooves and terminating adjacent to the teeth whereby the intermeshing teeth of the driving gears and driven gears will force lubricant through the ports into the grooves to lubricate the clutch faces on the washers and the clutch faces on the driven gears.

3. A differential gearing comprising a driving member including a housing, driving gears in the housing, driven gear members meshing with the driving gear member, clutch washers interposed between the driven members and the driving member, said clutch-faced washers interconnecting circular grooves eccentric one to the other and eccentric to the center of the washers, radial grooves connecting the circular grooves, and radial grooves communicating with the circular grooves and extending to the perimeter of the washers, the driven gears having ports extending laterally through them to communicate with the grooves in the washers whereby relative movement between the driving gears and driven gears will be effective in forcing lubricant through the ports in the driven gears into the grooves in the washers.

4. In a differential gearing, a driving member including a housing, pinion gears mounted in the housing, co-operating driven gears within the housing meshing with the pinion gears, the driven gears and the housing having sets of co-operating clutch faces, and means for providing films of oil between the sets of co-operating clutch faces through the action of the gears.

5. In a differential gearing, a driving member including a housing, pinion gears mounted in the housing, co-operating driven gears within the housing meshing with the pinion gears, the teeth of the pinion gears and driven gears being generated to have abnormally high pressure angles so that when the vehicle is moving in a straight line the driven gears will be spread apart, the driven gears having clutch faces to engage the housing when the driven gears are spreading apart and means providing films of oil between the clutch faces of the driven gears and the housing when the gearing is differentiating.

6. A differential gear, comprising a housing, sets of gears co-operating within the housing, one set of gears having clutch faces co-operating with complementary clutch faces on the housing, the teeth of the sets of the co-operating gears being generated to have relative high pressure angles to spread the set of gears having the clutch faces to cause the clutch faces of said gears to engage the complementary clutch faces on the housing and means tending to maintain films of oil between the sets of co-operating clutch faces through the action of the gears.

In testimony whereof I affix my signature.

ANDOR T. NOGRADY.